United States Patent
Clark

(10) Patent No.: US 9,436,458 B2
(45) Date of Patent: Sep. 6, 2016

(54) UPDATING A FILE USING DIFFERENCES AND FILE FORMAT THEREFOR

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 105 days.

(21) Appl. No.: 14/188,488

(22) Filed: Feb. 24, 2014

(65) Prior Publication Data

US 2014/0172800 A1    Jun. 19, 2014

Related U.S. Application Data

(63) Continuation of application No. 12/429,584, filed on Apr. 24, 2009, now Pat. No. 8,661,428.

(60) Provisional application No. 61/047,921, filed on Apr. 25, 2008.

(51) Int. Cl.
*G06F 9/44* (2006.01)
*G06F 17/30* (2006.01)

(52) U.S. Cl.
CPC . *G06F 8/68* (2013.01); *G06F 8/71* (2013.01); *G06F 17/30174* (2013.01)

(58) Field of Classification Search
CPC .............. G06F 8/60–8/68; G06F 8/70–8/71
USPC ................................................. 717/168–178
See application file for complete search history.

(56) References Cited

U.S. PATENT DOCUMENTS

| | | | |
|---|---|---|---|
| 5,819,292 A * | 10/1998 | Hitz | G06F 11/1435 707/999.203 |
| 6,098,079 A * | 8/2000 | Howard | G06F 17/30097 |
| 6,493,871 B1 * | 12/2002 | Welch et al. | 717/173 |
| 6,574,657 B1 | 6/2003 | Dickinson | |
| 7,024,452 B1 | 4/2006 | O'Connell et al. | |
| 7,124,408 B1 | 10/2006 | Parthasarathy et al. | |
| 7,191,327 B2 | 3/2007 | Viljoen et al. | |
| 7,275,244 B1 | 9/2007 | Bell et al. | |

(Continued)

FOREIGN PATENT DOCUMENTS

| | | |
|---|---|---|
| EP | 1035482 | 9/2000 |
| EP | 2444909 | 4/2012 |

OTHER PUBLICATIONS

Hashing and Fingerprinting—William Josephson—Princeton Univ.—Feb. 12, 2005.*

(Continued)

*Primary Examiner* — Francisco Aponte

(57) ABSTRACT

A method for updating and formatting a local file is described. An update file, having a newer version of the local file, is accessed from a server over a network and a list of new hash values corresponding to data blocks of the update file is retrieved. Divisions between the data blocks are located when a value of a rolling checksum reaches a particular value, the data blocks being of variable size. New hash values of the update file are compared with local hash values of the local file. For each of the new hash values not having a matching local hash value, the corresponding data block is downloaded from the server and written to a new file. For each of the new hash values having a matching local hash value, the corresponding block is copied from the local file to the new file.

15 Claims, 5 Drawing Sheets

(56) References Cited

U.S. PATENT DOCUMENTS

| | | | |
|---|---|---|---|
| 7,293,282 B2 | 11/2007 | Danforth et al. | |
| 7,373,643 B2* | 5/2008 | Radatti | 717/173 |
| 7,441,180 B1 | 10/2008 | Kaczmarek et al. | |
| 7,523,452 B1* | 4/2009 | Kamity et al. | 717/178 |
| 7,590,981 B2* | 9/2009 | Gupta et al. | 717/168 |
| 7,665,081 B1* | 2/2010 | Pavlyushchik | G06F 8/68 707/770 |
| 7,711,760 B2* | 5/2010 | Williams | 707/825 |
| 7,716,660 B2 | 5/2010 | Mackay | |
| 7,805,420 B2* | 9/2010 | Kapoor | G06F 17/30348 707/695 |
| 7,958,087 B2* | 6/2011 | Blumenau | G06F 17/30085 707/610 |
| 8,001,385 B2* | 8/2011 | Rudelic | G06F 21/572 713/176 |
| 8,020,209 B2* | 9/2011 | Kester | G06F 21/50 726/22 |
| 8,156,164 B2* | 4/2012 | Anderson | G06F 17/30171 707/822 |
| 8,281,298 B2 | 10/2012 | Bielski | |
| 8,386,743 B2* | 2/2013 | Okada et al. | 711/173 |
| 8,661,428 B2 | 2/2014 | Clark | |
| 2002/0170052 A1 | 11/2002 | Radatti | |
| 2005/0131939 A1 | 6/2005 | Douglis et al. | |
| 2006/0036684 A1 | 2/2006 | Schwerk | |
| 2007/0204003 A1 | 8/2007 | Abramson | |
| 2008/0071867 A1 | 3/2008 | Pearson et al. | |
| 2008/0092030 A1 | 4/2008 | Archer et al. | |
| 2009/0249324 A1* | 10/2009 | Brar et al. | 717/173 |
| 2009/0280906 A1* | 11/2009 | Larsen et al. | 463/42 |
| 2009/0280907 A1* | 11/2009 | Larsen et al. | 463/42 |
| 2012/0131566 A1* | 5/2012 | Morgan et al. | 717/170 |
| 2013/0055231 A1* | 2/2013 | Hyndman et al. | 717/169 |
| 2014/0304697 A1* | 10/2014 | Lin et al. | 717/170 |

OTHER PUBLICATIONS

Hashing and Fingerprinting—William Josephson—Princeton Univ.—Feb. 11, 2005.

International Search Report (Sep. 21, 2009), International Application No. PCT/US2009/041647.

Muthitacharoen A. et al. "A Low-Bandwidth Network File System" ACM Sosp. Proceedings of the ACM Symposium on Operating Systems Principles, ACM, US, Oct. 21, 2002, pp. 174-187.

Kutzner K. et al. "The IGOR File System for Efficient Data Distribution in the Grid" Proceedings of the Cracow Grid Workshop CGW 2006, [Online] Oct. 15, 2006-Oct. 18, 2006 Cracow, Poland ISBN: 83-915141-7-X Retrieved from the Internet: URL:http://i30www.ira.uka.de/research/publications/papers/index.php?docid=2181 &Iid=en>.

MJL: "Rabin Fingerprints" Internet Publication—Plan 9 and Inferno at the Google Summer of Code, [Online] Aug. 6, 2007, XP002544024 Retrieved from the Internet: URL:http://gsoc.cat-v.org/people/mjl/blog/2007 /08/06/1_Rabin_fingerprints/>.

Jain N. et al. "TAPER: Tiered Approach for Eliminating Redundancy in Replica Synchronization" Conference Proceedings 4th Usenix Conference on File and Storage Technologies, [Online] Dec. 13, 2006-Dec. 16, 2006, pp. 281-294, XP002544025 Retrieved from the Internet: URL:http://www.usenix.orgfeventsffasto5/tech/Jain.html>.

Manber U: "Finding Similar Files in a Large File System" Proceedings of the Winter Usenix Conference, XX, XX, Jan. 1, 1994, pp. 1-10, XPOO0886472.

* cited by examiner

UPDATING A FILE USING DIFFERENCES AND FILE FORMAT THEREFOR

CROSS REFERENCE TO RELATED APPLICATIONS

This Application claims benefit and is a continuation of U.S. patent application Ser. No. 12/429,584, filed Apr. 24, 2009, now U.S. Pat. No. 8,661,428, which claims benefit of U.S. Provisional Patent Application 61/047,921, filed Apr. 25, 2008 and entitled "Methods for Updating a File" the contents of both of which are wholly incorporated by reference.

BACKGROUND

Application virtualization enables complex software to be delivered as self-contained executable files which can run instantly from any data source with zero installation, i.e., copying individual files and settings to the computer system. Application virtualization can provide many benefits, depending on the implementation. For example, using application virtualization, large applications such as MICROSOFT® OFFICE® may be streamed from a shared network drive without any specialized client or server software. Using application virtualization, virtualized applications may be run in managed or unmanaged MICROSOFT WINDOWS® environments without requiring elevated security rights. This allows stronger security to be implemented by allowing applications that ordinarily require administrator rights to run on locked-down user accounts. A degree of isolation is imposed on virtualized applications, thereby protecting the local client computer against changes to the file system and registry for both custom developed and commercial applications, enabling true separation of application and operating system. Some implementations of application virtualization, during the process of virtualization, create a single secure executable file (a "container" file) which encapsulates all registry and file system changes associated with a normal installation.

The container file for a virtualized application may be large—a file size of hundreds of megabytes to a gigabyte or more is common. Thus, while application virtualization eliminates the need to install an application, there can still be significant time associated with downloading the container file, even using a high speed network connection. Users of these large applications typically do not download the application for each use; instead they store and run local copies (whether on- or off-line). There is, therefore, a need for determining whether the last-downloaded version of an application on the client computer is current, and for updating the application by downloading a new version if it is not.

Typically, to determine if an update is needed, a query is sent to the application update server. If a version check reveals that an update is available, the entire updated container file is downloaded to replace the old version, regardless of how small or large a change has been made. The time for downloading the update is as large as (or often larger than) the time required to download the old version.

The problem of minimizing the time required for updating large files and large sets of files occurs in other situations as well. Another example is the synchronization of files among a set of computers that share common data and user files. Such synchronization can be needed between the files on a user's desktop (non-portable) and laptop (portable) computers as well as among a set of machines belonging to the members of a workgroup or company. Synchronization is also needed to maintain "mirror" sites for servers where heavy downloading demand is supported by creating a set of alternative servers providing identical files.

One tool for managing file updating is provided by Rsync, an open-source software package available for Unix and related operating systems. The receiver (whose file copy needs to be updated) splits its copy of the file into fixed-size non-overlapping blocks, and computes the MD4 hash for each block plus rolling checksums for the entire file using file segments that are the same length as the block size. The receiver sends the hash codes and rolling checksums to the sender (the update server that has the update file). The sender computes rolling checksums by the same method on the update file and compares its rolling checksums with the set sent by the receiver to determine if any matches exist. If they do, it verifies the match by computing the MD4 hash for the matching block and by comparing that as well. The probability of a match for both the checksum and hash for blocks that are not identical is extremely low. The sender then sends to the receiver those blocks that do not match any of the receiver's blocks, together with assembly instructions on how to merge these blocks into the receiver's version to create a file identical to the sender's copy. If the sender and receiver versions of the file have many blocks in common, relatively little data is transferred to synchronize the files.

Rsync also supports other features including data compression/decompression to further reduce the amount of data to be transmitted and encryption/decryption for data security.

SUMMARY

A method for updating a local file and an advantageous format of the file to be updated allows for any prior version of a file to be updated to a current version present on a server. In the method, an update file, which is a newer version of the local file, is accessible from a server over a network. A list of new hash values corresponding to data blocks of the update file is retrieved from the server. An algorithm locates divisions between the data blocks when a value of a rolling checksum reaches a particular value, the blocks being of variable size. New hash values of the update file are compared with local hash values of the local file. For each of the new hash values not having a matching local hash value, the corresponding data block is downloaded from the server and written to a new file. For each of the new hash values having a matching local hash value, the corresponding block is copied to the new file. The procedure is executed entirely on the client.

DETAILED DESCRIPTION

Figure 1:
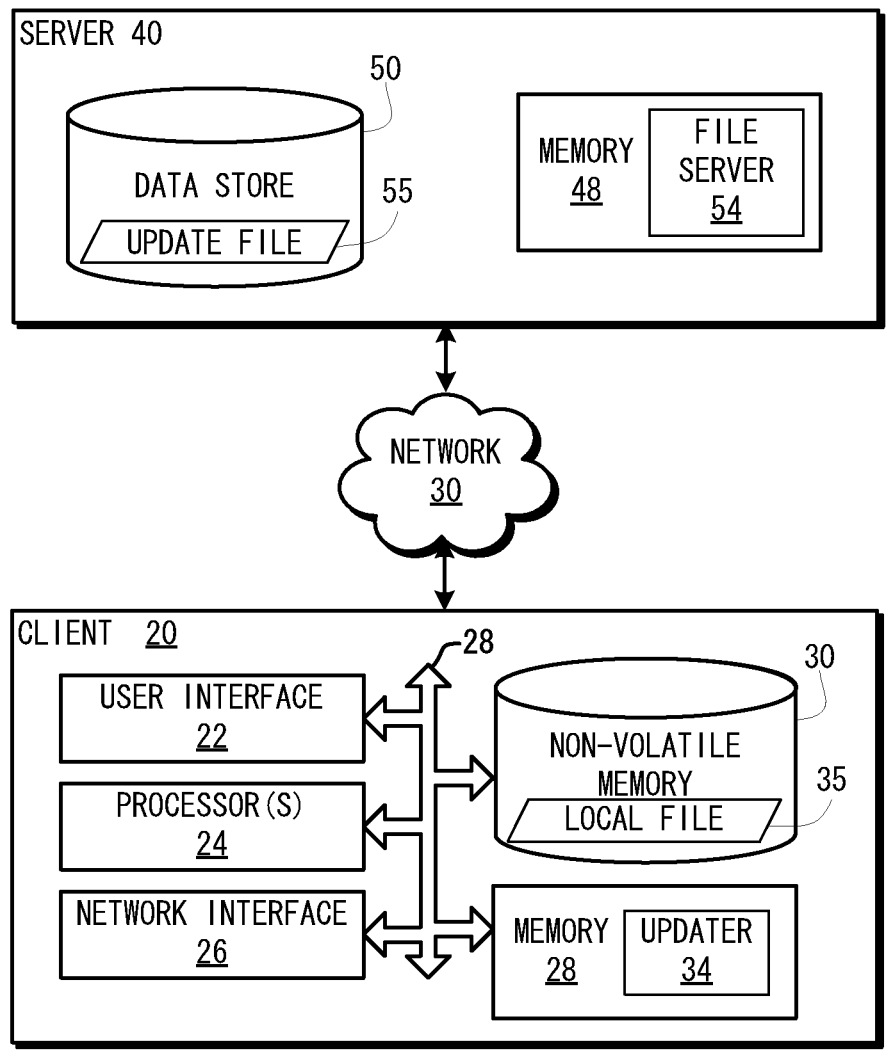
FIG. 1 shows a system of networked computers.

Although the algorithm and method herein described can be implemented in various systems, by way of example, FIG. 1 represents a system of networked computers 10 including a client 20, a network 30, and a server 40 wherein a local file 35 is present on client 20 that has a corresponding newer version of the file, identified as update file 55, on or accessible by a server 40. In this instance, it is assumed that update file 55 has portions in common with local file 35 and it is desired to modify local file 35 to make it identical to update file 55 without downloading the entire update file 55.

Client 20 may be a general purpose computer system having traditional components of a general purpose computer system. Client 20 is connected to network 30. In addition to running local applications, client 20 capable of receiving data in response to queries transmitted on network 30. In particular, files and applications or portions thereof can be received from server 40 over network 30, store them in local storage, and use them.

In this example, client 20 includes a user interface 22, one or more processors, 24, a network interface 26, memory 28 and non-volatile memory 30. User interface 22 may comprise, for example, a video display output, and keyboard and mouse input devices. Processors 24 may be any of a variety of computer processing devices that are capable of executing computer instructions stored in memory 28 and acting on data also stored in memory 28. Network interface 26 connects client 20 to network 30. Memory 28 and non-volatile memory 30 may be implemented by some form of machine readable storage medium, such as RAM, magnetic, or optical media. Memory 28 may comprise a system of physical memory devices arranged in a hierarchical manner, including one or more levels of cache memory, as well known in the art of computer system memories. In this view, non-volatile memory 30, or portions thereof, may be considered to be part of memory system 28. Non-volatile memory 30 comprises a machine readable storage medium capable of retaining data without externally supplied power. Non-volatile memory may be a solid state device such as a "FLASH" memory device, or it may be a rotating magnetic or optical media, as well known in the art. Although memory 28 and non-volatile memory 30 are shown in FIG. 1 as being "within" or part of local computer 20, it should be understood that either may be wholly or partially external to local computer 20, e.g., accessible over network 30 or other data connection.

Network 30 may be one or more interlinked networks such as local or wide area networks. Server 40 may also be a general purpose computer (not all shown) similar to client 20. Server 40 is connected to network 30 and is configured to receive queries from client 20 and other computers on network 30 and deliver data in response to the queries. In particular, files and applications or portions thereof can be sent to one or more other machines (clients) on a network using a standard protocol such as HTTP. HTTP (Hypertext Transfer Protocol) is actually a set of protocols for communication between clients and servers on a network. Standard HTTP protocols exist for requesting both entire files as well as portions of files specified as a list of blocks defined by offset and length within a file. Server 40 includes memory 48 having file server software 54 for accessing update file 55 and transmitting all or part of update file 55 to local computer 20 or other users or computers (not shown) in response to queries.

Figure 2:
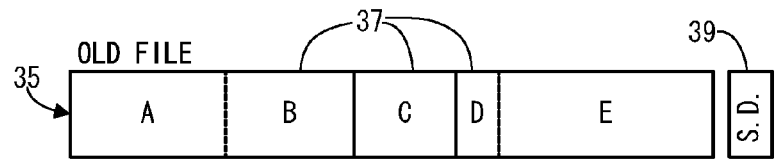
FIG. 2 shows a schematic representation of a local file.

FIG. 2 shows a schematic representation of an local file 35 to illustrate by way of example a method to break local file 35 into logical blocks. Each logical block comprises a region of contiguous data that forms part of a file. Blocks can be variable in length. As with all computer files, local file 35 is formed from a string of numerical values. Each numerical value represents an unit of data. In the present example, the unit is a byte. Each byte is addressable as an offset from the start of local file 35. Local file 35 a corresponding synchronization ("sync") directory 39 containing a list or other data structure that defines the location of a plurality of blocks 37 of data within local file 35. Divisions between blocks 37 being located according to an algorithm. According to the algorithm, blocks 37 may be of varying length with the property that each block begins immediately after the last data unit of the previous block, and ends when a rolling checksum reaches a particular value. The particular value may be fixed for each block of a file or varying according to selected criteria or rules such that the like blocks are defined each time the algorithm is carried out on multiple versions of the file. In one embodiment, the particular value is fixed to a predetermined value. The first block (block "A" in this example) begins at the start of the file and the last block (block "E") ends at the end of the file. The start of each block is identified using an offset into local file 35. For each block 37, a corresponding hash value is calculated and stored in sync directory 39 along with the location (offset of first byte) and block size (e.g., in bytes). In one embodiment, a minimum and maximum block size is established as part of the algorithm.

Figure 3:
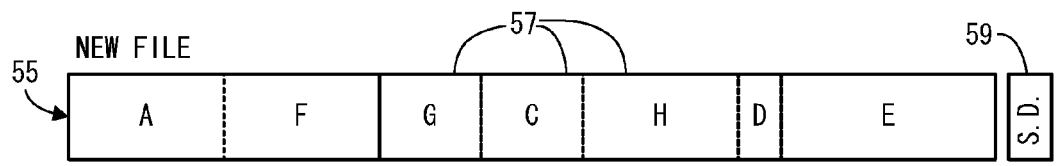
FIG. 3 shows a schematic representation of an update file.

FIG. 3 shows a representation of an update file 55 to illustrate by way of example differences between local file 35 (FIG. 2) and update file 55. In this case, local file is shorter than update file, although that may or may not be the case for any particular file to be updated using the method herein described. Local file 35 and update file 55 have some data blocks in common, specifically, data blocks A, C, D, and E. Update file has additional data blocks F, G, and H. Although data blocks C, D, and E, are common to both files, they may have differing offsets, i.e., they may occur at different locations within update file 55 than in local file 35. As with local file 35, update file 55 includes a sync directory 59 containing the locations of block divisions and hash values for each of the blocks 57. The rolling checksums will have the same value at the ends of unchanged blocks, and the algorithm will tend to draw block divisions so that those same blocks are defined, regardless of how they may have moved in the updated file.

Block sizes are allowed to vary between minimum and maximum sizes with a user-specifiable average size. A typical average block size may be 64 KB. The maximum block size can be set to about twice the average block size. In one embodiment, divisions between successive blocks are located such that for a specific file, the checksum at the block division is always a predetermined value. As mentioned above, however, the value may vary from file to file according to any arbitrary selection criteria such that a particular value is identified for each block division and like blocks are reliably identified across multiple versions of the file.

In one embodiment, hashes are calculated for all blocks and for the file as a whole, the latter being referred to herein as a "global" hash. The global hash may be calculated for all of the data in a file rather than blocks of data within it. In some cases however, some portions of the file may be excluded. Excluded data may include reserved data that records information about the file (such as the calculated hashes embedded within the file). Various hash algorithms can be used. In one embodiment, the SHA-1 algorithm is used. SHA-1 is a particular well known algorithm for calculating a hash. SHA-1 provides a 160-bit (20-byte) result and improved security over previous algorithms such as MD5. SHA-1 is described in FIPS PUB 180-1 by the National Institute of Standards and Technology (NIST) (1995). Since hashes are stored in the sync directory, they only need to be calculated once when the file is created. Update process 140 can therefore be located entirely on the client computer (where the user file is to be updated); the server having the new version of the file need only supply requested blocks of data 150 using standard file server 54 (FIG. 1).

Figure 4:
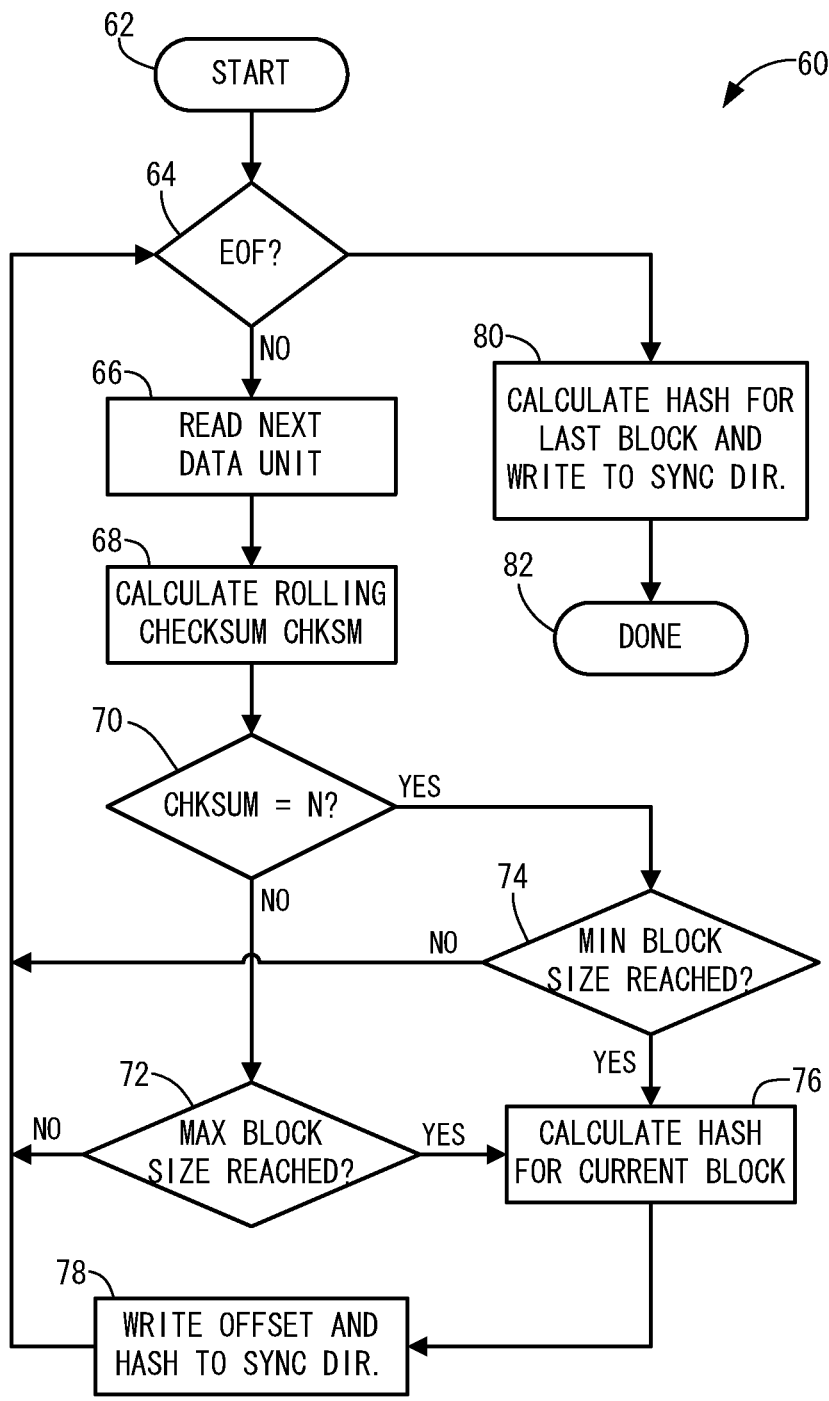
FIG. 4 shows a flowchart illustrating by way of example an exemplary method for creating sync directory.

FIG. 4 shows a flowchart 60 illustrating by way of example an exemplary method for creating sync directory 39. The method begins as indicated by start block 62 and proceeds to operation 64 wherein it is determined if the end of the file has been reached in the course of reading data sequentially from the file (as described below with reference to operation 66). If there is data yet to be read in the file, then the method flows from operation 64 to operation 66, wherein a next data unit is read from the file. In one embodiment, the next data unit is the next byte of data.

The method proceeds to operation 68 wherein a rolling checksum value CHKSM is calculated. The rolling checksum may be the sum of values of the previous X data units although other methods for calculating a checksum may be used. In one embodiment, the rolling checksum is calculated for a predetermined length X of 2048 bytes (2 kB), in which carry bits are discarded. In one embodiment, the rolling checksum addition is modulo 256. The rolling checksum may be quickly calculated by taking the previous rolling checksum value, adding the new value, and subtracting the previous oldest value. After calculating the new rolling checksum value, the procedure flows to operation 70.

In operation 70, it is determined whether the rolling checksum value CHKSM is equal to some arbitrary and previously determined value N. If CHKSM is not equal to N, then the procedure flows to operation 72, wherein it is determined if the maximum block size is reached. If the maximum block size is not reached, then the procedure returns to operation 64, but if the maximum block size is reached, then the procedure jumps to operation 76, described below.

If, in operation 70, it is determined that the checksum value CHKSM does equal N, then the procedure flows to operation 74, wherein it is determine whether the minimum block size is reached. If the minimum block size is not reached, then the procedure returns to operation 64. Otherwise, the procedure flows to operation 76.

In operation 76, a hash is calculated for the current block. The current block extends from the end of the previous block (or the beginning of the file when there is no previous block) to the current position in the file. A hash value is typically a relatively small integer that is calculated by a well-defined formula from a set of data ("dataset"). In this case, "relatively small" is measured by comparison to the size of the dataset. A checksum is a kind of hash by this definition, and a hash can be used as a checksum, but the term hash is usually applied to the output of more complex algorithms that are more "robust" than checksums in the sense that the resulting number is almost certain to be unique. Thus, while checksums are quick and easy to calculate, they can be "fooled" in the sense that certain kinds of differences or errors (the addition of zeros or the swapping of bytes, for example) may not change a checksum. A checksum is usually one or two bytes in length. Hashes, on the other hand, are designed so that any likely change in the set of data will result in a different hash. There are many specific algorithms known in the art that can be used. The hash may be significantly longer than the checksum. The SHA-1 hash algorithm, e.g., generates hashes of 160 bits in length. Hashes are known in the art to speed up table lookup and data comparison tasks.

After the hash is calculated in operation 76, the procedure flows to operation 78 wherein the offset, i.e., current position in the file, and the hash value is written to the sync directory. The procedure then returns to operation 64. Once the end of file is reached at operation 64, the hash value for the final block is calculated and written to the sync directory in operation 80 and the procedure ends as indicated by done block 82.

The above procedure is performed for local file 35 and update file 55. The sync directory may be maintained as a separate file as shown in FIGS. 2 and 3 or appended to the file as described below with reference to FIG. 6. Since local file 35 and update file 55 each include a corresponding sync directory, it is possible to update any arbitrary local file with needed blocks from the server computer by reading only the missing blocks, using the sync directory to identify the needed blocks. Furthermore, this operation can occur entirely on the client computer.

Figure 5:
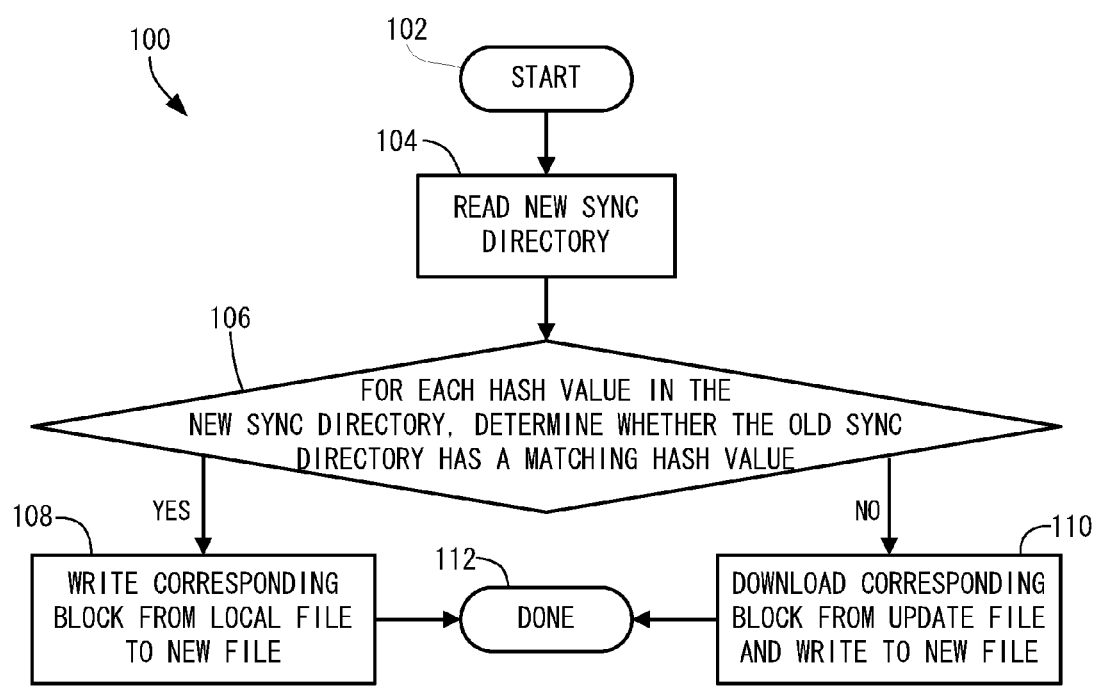
FIG. 5 shows a flowchart illustrating by way of example a procedure overview for using the sync directory information of local and update files to identify needed blocks and assemble a copy of the update file on the client computer.

FIG. 5 shows a flowchart 100 illustrating by way of example a procedure overview for using the sync directory information of local and update files to identify needed blocks and assemble a copy of the update file (the "new local file") on the client computer. This procedure can be performed by updater 34 (FIG. 1) on the client computer by simply reading parts of the update file and sync directory received from the server. The procedure begins as indicated by start block 102 and flows to operation 104 wherein the new sync directory, i.e., the sync directory for update file 55 is downloaded from the server and read. Then, in operation 106, for each hash value in the new sync directory, the sync directory for the local file is checked to see if a matching hash value exists. If so, then the block from the local file corresponding to the matching hash value is written to a new copy of the updated file. If no matching hash value is present in the local file, then the corresponding block is downloaded from the update file on the server and written to the new copy. After all the blocks identified by the new sync directory are assembled in the new copy of the updated file, the procedure ends as indicated by done block 112.

Figure 6:
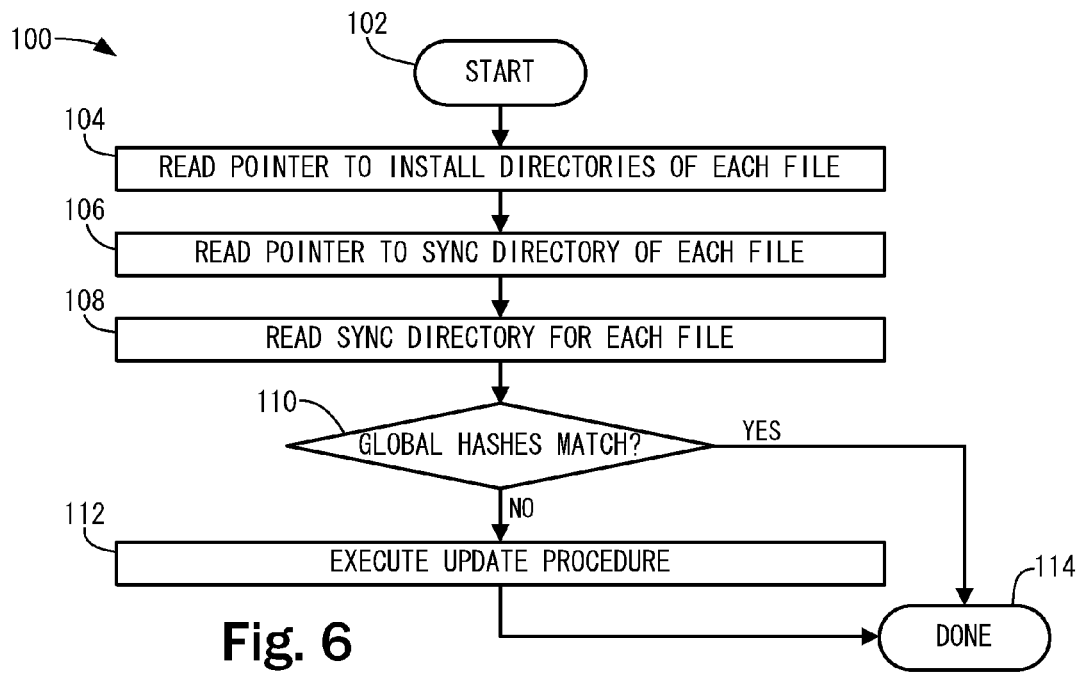
FIG. 6 shows a flow chart for illustrating an exemplary procedure for updating a file having the sync directory appended to the file itself.
Figure 7:
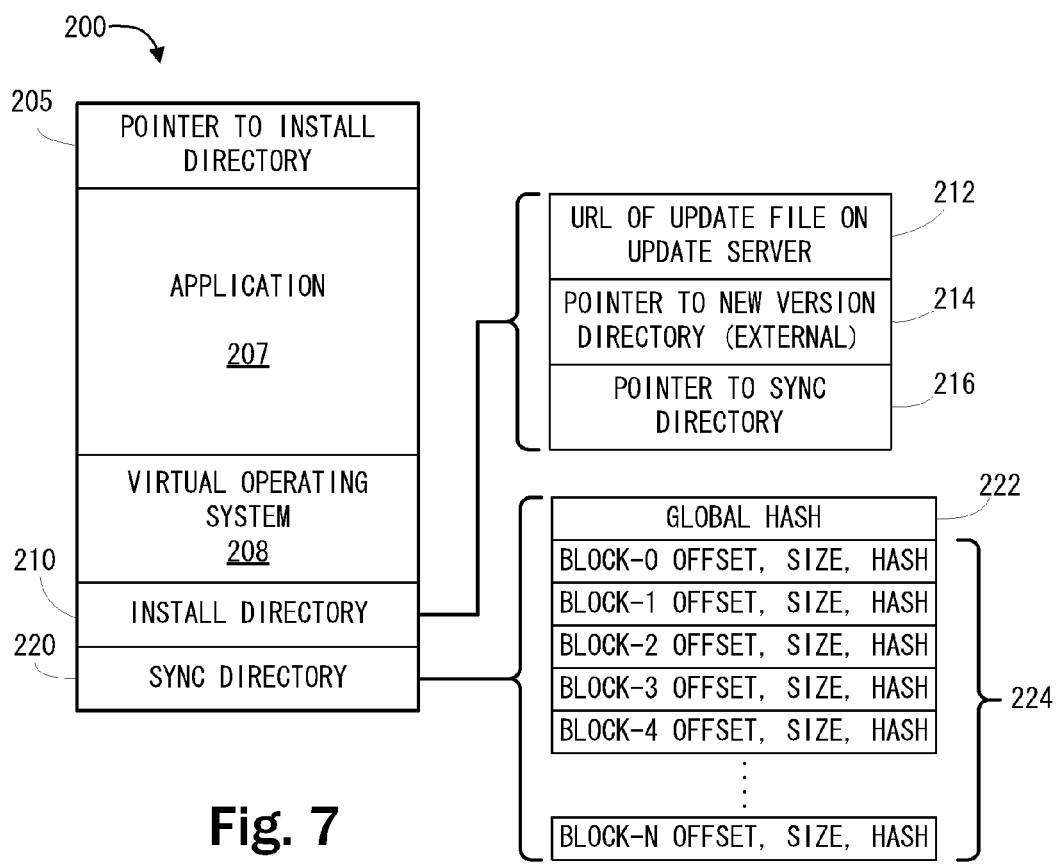
FIG. 7 shows an exemplary file having a format wherein hashes are stored in a reserved area within the file itself.
Figure 8:
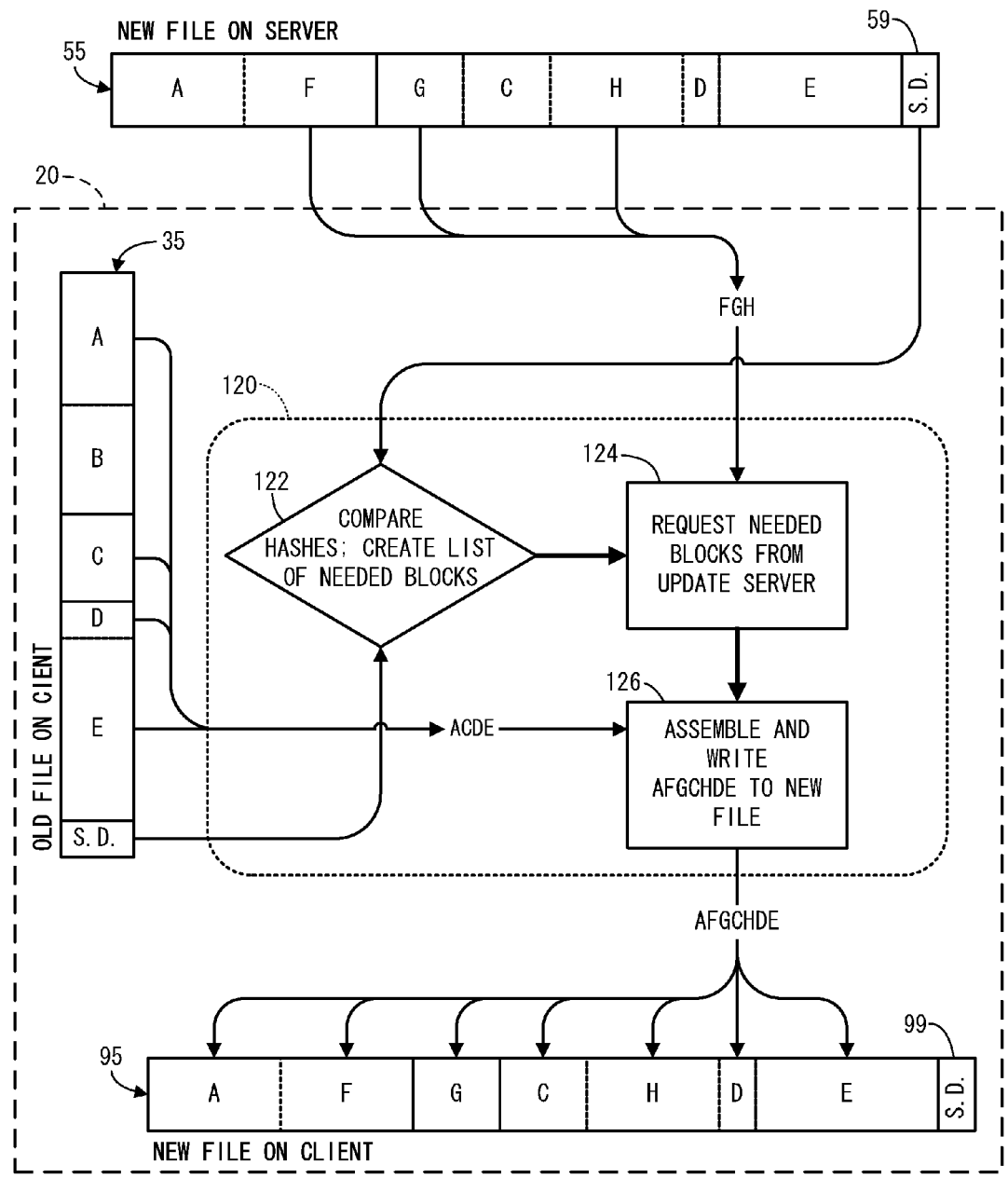
FIG. 8 shows a flow diagram illustrating by way of example an update process for updating a local file using information from an update file on a remote server.

FIGS. 6 and 7 show a flow chart and file schematic, respectively, for illustrating an exemplary procedure for updating a file having the sync directory appended to the file itself. FIG. 7 shows an exemplary file 200 having a format wherein hashes are stored in a reserved area within the file itself ("reserved" in the sense that the hashes themselves are not part of file "blocks" and are not used to calculate any hash). Sync directory 220 is the reserved area of file 200, and the remaining sections of the file are divided into blocks, as shown in FIG. 8, without reference to the functional divisions illustrated. In the example of FIG. 7, the "payload" portion of file 200 includes a packaged virtual application 207 and virtual operation system 208, but other payload or data may be similarly contained in file 200.

Referring to FIG. 6, the procedure begins as indicated by start block 102 and flows to operation 104, wherein pointers 205 to install directories 210 of each file (local and update) are read. Pointer 205 includes an offset and size of install directory 210. Pointer 205 in this case is at the start of file 200, but can be in any fixed or known location within the file. It is also possible to store the pointer in file metadata, a registry setting, or some other location such as a separate file. In operation 106, sync directory pointer 216 is read from each files' install directory 210 to find the location of sync directory 220. Install directory 210 is described in more detail below.

In operation 108, sync directory 220 for each file is read. Sync directory 220 includes a global hash 222 and a list of blocks 224. Global hash 222 is a hash value based on the contents of all the blocks of the file. In operation 110, it is determined whether the global hashes of the local and update files match. If the global hashes of both the local and update files match, it implies that the update file is the same version and is identical to the local file and the procedure ends as indicated by done block 114. However, if the global hashes do not match, then the procedure flows to operation 112 wherein the update procedure is executed. The procedure then ends as indicated by done block 114.

Thus, in this embodiment, three reads are required from the file to extract the value of the global hash 220. For the local file, this is not a problem, but three read requests are also required to retrieve the global hash for the latest update file 55 on the update server 40. However, since the only information desired is whether the two files are the same, one can initially assume that they are, in fact, the same, and that the install directory pointer 205, the sync directory pointer 216, the install directory 210, and the sync directory 220 are similarly identical. Thus, in another embodiment, the file offset for the global hash 222 found for the local file 35 can be used to generate a single read request to obtain the global hash 222 or other data at that location for the remote update file 55. If the local global hash is the same as the data retrieved at the same location of the update file, then no update is available, and the update does not proceed.

FIG. 8 is a flow diagram illustrating by way of example an update process 120 for updating a local file 35 using information from an update file 55 on a remote server 40 (FIG. 1). The procedure will be described with additional reference to FIG. 7.

In operation 122, the full set of block hashes 224 is retrieved from sync directory 59 of update file 55 on the server 40. Hashes 224 are compared with the hashes from the local file 35. From this comparison, a list of blocks in the update file 55 that are not present in local file 35, i.e., blocks F, G, and H in this example, is created. Then in operation 124, each of those blocks is retrieved from server 40. Finally, the sync directory 59 is used as a guide in operation 126 to merge needed blocks A, C, D, and E, in the correct order (according to sync directory 59) with retrieved blocks F, G, and H from local file 35, which are then written as new file 95. To retrieve just the new blocks F, G, and H, remote read requests are issued to server 40.

One result of the methods as described above is that at the conclusion of an update process 140, two versions of the file—old local file 35 and new local file 95—are present on the client computer. Old local file 35 can optionally be deleted. However, in some implementations, it may be advantageous to retain both versions. For example, when each file corresponds to a version of a virtualized application, a user can launch and use the current version of an application while the new version is being created by the update process. The update process can be triggered by the act of launching the application, and it can proceed as a background task as long as the client computer is connected to a network which has access to server 40. Once an update has been completed, and a new version is available, the next time the application is launched, the new version is used. Typically, the oldest version is always retained as a master file.

In one embodiment, local file 35 includes a pointer 214 (FIG. 7) to a location to look for any updates previously created as well as the URL 212 of the update file 55 on the update server 40. Then when the application is launched, it first looks for any updates at URL 212 and runs the most recently updated version, e.g., new file 95 on the local computer if present.

In one embodiment, shortcuts and icons for a virtualized application on a user computer always point to the oldest file version present. When launched, the application first checks for a newer version. If a newer version is present, the oldest version shuts down, and the newer version launches in its place. The newer version then performs the necessary global hash comparisons to determine if an update is available. This sequence provides for the option of changing the URL 212 of the update file 55 and the pointer 214 to the new version directory in addition to any updates to the Application 207 or VOS 208.

In a further embodiment, it is possible to make use of more than one local copy of the file during the update process. The hash tables for all local versions can be searched for blocks that can be used in preference to one retrieved via a remote read request. Depending on the availability of local file storage space, and the size of the file, one can also vary the number of versions that are retained. Typically, at least the original version (first downloaded version) and the latest updated version are retained, but additional intermediate versions can also be retained.

When using the methods disclosed herein to update the container files for virtualized applications, it is not necessary to perform incremental updates (version 1 to version 2 to version 3, etc.) as is typically required by update methods for regular applications that are incrementally installed. Instead, one can update directly from whatever current version is installed to the latest available update version without installing intermediate versions. While it is true that for many typical users of the methods disclosed herein, applications will tend to be updated to each incremental version as it becomes available, such need not be the case; some users may fail to download one or more updates. For example, some users may launch a particular application infrequently, or they may only connect infrequently to a network which has access to the update server. The methods described herein are not dependent on the age or version of the current installation; they simply compare the currently installed version(s) with the latest update version on the update server and download whatever is needed to create the new version.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable storage media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
    identifying, by a client computer, a first sync directory for a first version of a file stored locally on the client computer, wherein the first sync directory includes a plurality of first hash values, each first hash value corresponding to a respective one of a plurality of blocks in the first version of the file, and wherein the first sync directory also includes a first global hash value based on the contents of all the blocks of the first version of the file;
    obtaining, from a remote server computer, a second sync directory for a second version of the file, wherein the second sync directory includes a plurality of second hash values, each second hash value corresponding to a respective one of a plurality of blocks in the second version of the file, and wherein the second sync directory also includes a second global hash value based on the contents of all the blocks of the second version of the file;
    wherein divisions between the plurality of blocks in the first version of the file and the plurality of blocks in the second version of the file are generated according to an algorithm, the algorithm locating divisions between blocks at positions within a particular file when a value of a rolling checksum reaches a particular value;
    determining whether the first global hash value and the second global hash value match; and
    in response to determining that the first global hash value and the second global hash value do not match, generating a new copy of the second version of the file stored locally on the client computer, comprising:
        determining, by the client computer and for each of the plurality of second hash values in the second sync directory for the second version of the file, whether the second hash value has a matching first hash value in the first sync directory for the first version of the file,
        for each second hash value that does not have a matching first hash value:
            downloading, by the client computer and from the remote server, the block in the second version of the file that corresponds to the second hash value, and
            writing, by the client computer, the downloaded block to the new copy of the second version of the file, and
        for each second hash value that has a matching first hash value:
            writing, by the client computer, the block corresponding to the first hash value matching the second hash value to the new copy of the second version of the file without downloading the block in the second version of the file that corresponds to the second hash value.

2. The method of claim 1, wherein identifying the first sync directory comprises identifying a reserved area within the first version of the file that stores the first sync directory.

3. The method of claim 1, wherein obtaining the second sync directory for the second version of the file comprises obtaining the second sync directory from a reserved area within the second version of the file.

4. The method of claim 1, wherein obtaining, from the remote server computer, the second sync directory comprises:
   identifying, from the first version of the file, a URL pointing to the second version of the file; and
   obtaining the second sync directory using the URL.

5. The method of claim 1, further comprising:
   receiving, while generating the new copy of the second version of the file, a request to access the file; and
   providing access to the first version to the file in response to the request.

6. The method of claim 1, further comprising:
   storing the obtained second sync directory in association with the new copy of the second version of the file stored locally on the client computer.

7. The method of claim 1, comprising:
   obtaining a file offset for the first global hash value; and
   using the file offset for the first global hash value to obtain the second global hash value.

8. A non-transitory machine readable storage medium storing instructions, that when executed by a client computer, cause the client computer to perform operations comprising:
   identifying a first sync directory for a first version of a file stored locally on the client computer, wherein the first sync directory includes a plurality of first hash values, each first hash value corresponding to a respective one of a plurality of blocks in the first version of the file, and wherein the first sync directory also includes a first global hash value based on the contents of all the blocks of the first version of the file;
   obtaining, from a remote server computer, a second sync directory for a second version of the file, wherein the second sync directory includes a plurality of second hash values, each second hash value corresponding to a respective one of a plurality of blocks in the second version of the file, and wherein the second sync directory also includes a second global hash \value based on the contents of all the blocks of the second version of the file;
   wherein divisions between the plurality of blocks in the first version of the file and the plurality of blocks in the second version of the file are generated according to an algorithm, the algorithm locating divisions between blocks at positions within a particular file when a value of a rolling checksum reaches a particular value;
   determining whether the first global hash value and the second global hash value match; and
   in response to determining that the first global hash value and the second global hash value do not match, generating a new copy of the second version of the file stored locally on the client computer, comprising:
      determining, for each of the plurality of second hash values in the second sync directory for the second version of the file, whether the second hash value has a matching first hash value in the first sync directory for the first version of the file,
      for each second hash value that does not have a matching first hash value:
         downloading, from the remote server, the block in the second version of the file that corresponds to the second hash value, and
         writing the downloaded block to the new copy of the second version of the file, and
      for each second hash value that has a matching first hash value:
         writing the block corresponding to the first hash value matching the second hash value to the new copy of the second version of the file without downloading the block in the second version of the file that corresponds to the second hash value.

9. The machine readable storage medium of claim 8, wherein identifying the first sync directory comprises identifying a reserved area within the first version of the file that stores the first sync directory.

10. The machine readable storage medium of claim 8, wherein obtaining the second sync directory comprises obtaining the second sync directory from a reserved area within the second version of the file.

11. The machine readable storage medium of claim 8, wherein obtaining, from the remote server computer, the second sync directory comprises:
   identifying, from the first version of the file, a URL pointing to the second version of the file; and
   obtaining the second sync directory using the URL.

12. A system comprising one or more storage devices storing instructions that, when executed by a client computer, cause the client computer to perform operations comprising:
   identifying a first sync directory for a first version of a file stored locally on the client computer, wherein the first sync directory includes a plurality of first hash values, each first hash value corresponding to a respective one of a plurality of blocks in the first version of the file, and wherein the first sync directory also includes a first global hash value based on the contents of all the blocks of the first version of the file;
   obtaining, from a remote server computer, a second sync directory for a second version of the file, wherein the second sync directory includes a plurality of second hash values, each second hash value corresponding to a respective one of a plurality of blocks in the second version of the file, and wherein the second sync directory also includes a second global hash value based on the contents of all the blocks of the second version of the file;
   wherein divisions between the plurality of blocks in the first version of the file and the plurality of blocks in the second version of the file are generated according to an algorithm, the algorithm locating divisions between blocks at positions within a particular file when a value of a rolling checksum reaches a particular value;
   determining whether the first global hash value and the second global hash value match; and
   in response to determining that the first global hash value and the second global hash value do not match, generating a new copy of the second version of the file stored locally on the client computer, comprising:
      determining, for each of the plurality of second hash values in the second sync directory for the second version of the file, whether the second hash value has a matching first hash value in the first sync directory for the first version of the file,
      for each second hash value that does not have a matching first hash value:
         downloading, from the remote server, the block in the second version of the file that corresponds to the second hash value, and writing the downloaded block to the new copy of the second version of the file, and for each second hash value that has a matching first hash value:

writing the block corresponding to the first hash value matching the second hash value to the new copy of the second version of the file without downloading the block in the second version of the file that corresponds to the second hash value.

13. The system of claim 12, wherein identifying the first sync directory comprises identifying a reserved area within the first version of the file that stores the first sync directory.

14. The system of claim 12, wherein obtaining the second sync directory comprises obtaining the second sync directory from a reserved area within the second version of the file.

15. The system of claim 12, wherein obtaining, from the remote server computer, the second sync directory comprises:

identifying, from the first version of the file, a URL pointing to the second version of the file; and obtaining the second sync directory using the URL.

* * * * *